(12) United States Patent
Green et al.

(10) Patent No.: US 12,190,638 B2
(45) Date of Patent: *Jan. 7, 2025

(54) COMPACT SYSTEM AND METHOD FOR IRIS RECOGNITION

(71) Applicant: Princeton Identity, Hamilton, NJ (US)

(72) Inventors: John Timothy Green, Hamilton, NJ (US); David Alan Ackerman, Hopewell, NJ (US); Jean-Michel Florent, Hamilton, NJ (US)

(73) Assignee: Princeton Identity, Hamilton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,701

(22) Filed: Feb. 1, 2024

(65) Prior Publication Data

US 2024/0169763 A1    May 23, 2024

Related U.S. Application Data

(63) Continuation of application No. 17/517,185, filed on Nov. 2, 2021, now Pat. No. 11,922,727.

(Continued)

(51) Int. Cl.
*G06V 40/18* (2022.01)
*G06V 10/25* (2022.01)
*G06V 10/75* (2022.01)

(52) U.S. Cl.
CPC ............ *G06V 40/197* (2022.01); *G06V 10/25* (2022.01); *G06V 10/751* (2022.01); *G06V 40/193* (2022.01)

(58) Field of Classification Search
CPC .... G06V 40/197; G06V 10/25; G06V 10/751; G06V 40/193; G06V 10/273;
(Continued)

(56) References Cited

U.S. PATENT DOCUMENTS

| 6,714,665 B1 | 3/2004 | Hanna et al. | |
|---|---|---|---|
| 2015/0029322 A1* | 1/2015 | Ragland | A61B 3/113 348/78 |

(Continued)

OTHER PUBLICATIONS

Camus, T. and R. Wildes "Reliable and fast eye finding in close-up images" Proceeding of the 16th International Conference on Pattern Recognition, Aug. 11-15, IEEE Computer Society, Washington DC., USA., Feb. 2002, 6 pgs., DOI: 10.1109/ICPR.2002.1044732.

*Primary Examiner* — Santiago Garcia
(74) *Attorney, Agent, or Firm* — Young Basile Hanlon & MacFarlane, P.C.

(57) ABSTRACT

Disclosed herein are methods, apparatus, and systems for iris recognition. A method includes acquiring at least two angularly differentiated iris images from a subject needing access, processing each of the at least two angularly differentiated iris images to generate at least one boundary delineated image from one of the at least two angularly differentiated iris images, applying image comparative analysis to the at least two angularly differentiated iris images to generate a boundary delineated image when the processing fails to produce the at least one boundary delineated image, segmenting and encoding one of the at least one boundary delineated image or the boundary delineated image to generate at least one iris template, matching the at least one iris template against an enrolled iris, and accepting the subject for access processing when the at least one iris template matches the enrolled iris.

20 Claims, 10 Drawing Sheets

Related U.S. Application Data

(60) Provisional application No. 63/108,575, filed on Nov. 2, 2020.

(58) Field of Classification Search
CPC ......... G06V 40/19; G06T 7/0012; G06T 7/11; G06T 7/13; G06T 2207/30041
See application file for complete search history.

(56) References Cited

U.S. PATENT DOCUMENTS

| | | | | |
|---|---|---|---|---|
| 2016/0350594 | A1* | 12/2016 | McDonald | H04N 23/51 |
| 2018/0025207 | A1* | 1/2018 | Santos-Villalobos | G06T 5/50 |
| | | | | 382/117 |
| 2020/0364441 | A1* | 11/2020 | O'Sullivan | G06V 40/193 |
| 2022/0100268 | A1* | 3/2022 | Weinberg | G06T 7/75 |
| 2023/0169793 | A1* | 6/2023 | Ogino | H04N 23/675 |
| | | | | 348/78 |

* cited by examiner

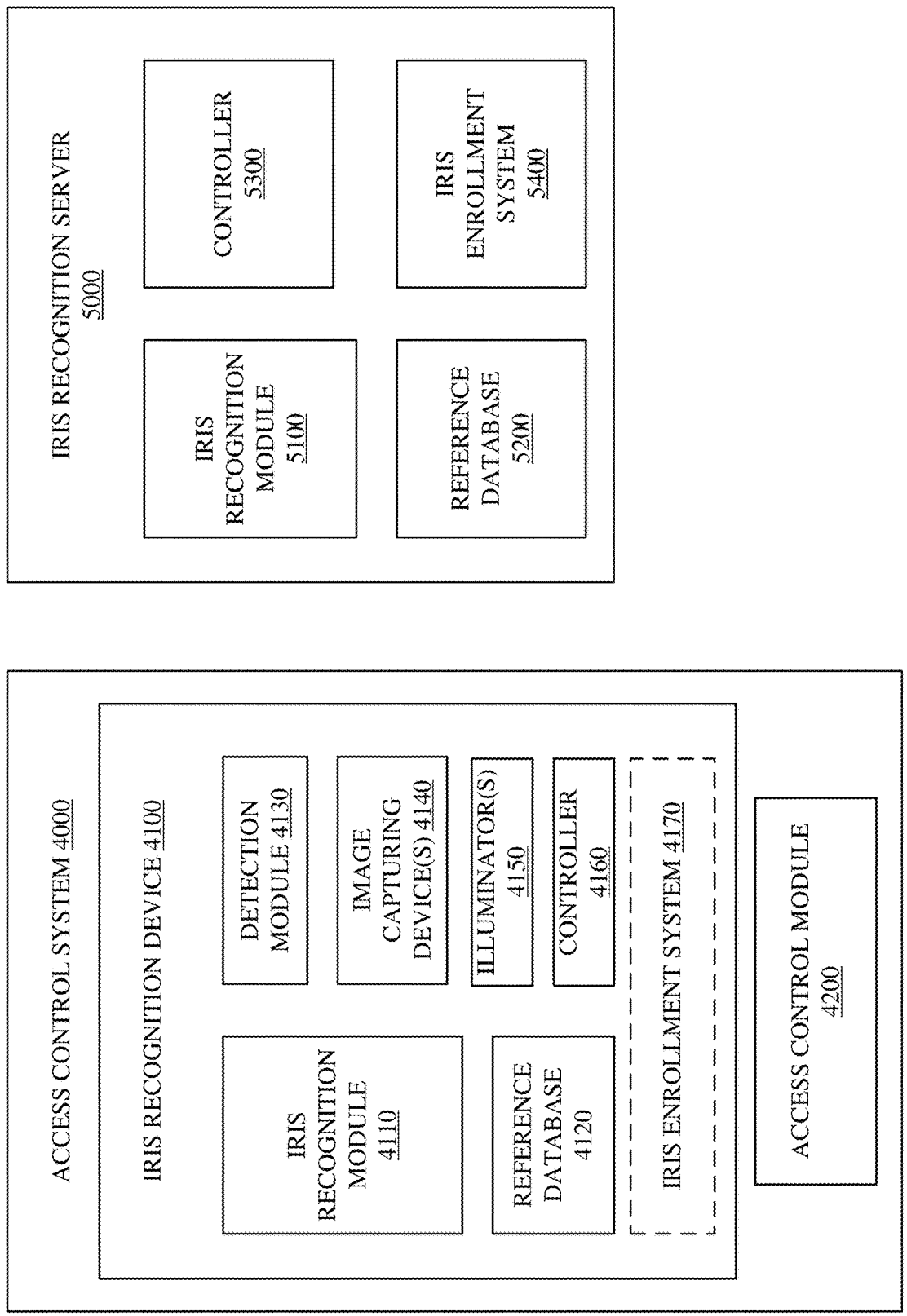

COMPACT SYSTEM AND METHOD FOR IRIS RECOGNITION

CROSS-REFERENCE TO RELATED APPLICATION(S)

This application is a continuation of U.S. patent application Ser. No. 17/517,185, filed on Nov. 2, 2021, which claims priority to and the benefit of U.S. Provisional Patent Application No. 63/108,575, filed Nov. 2, 2020, the entire disclosures of which are hereby incorporated by reference.

TECHNICAL FIELD

This disclosure relates to biometric recognition. More specifically, this disclosure relates to iris recognition.

BACKGROUND

Individuals can be recognized using a variety of biometric methods, e.g., face, fingerprint, and irises. Some of these biometric methods, such as fingerprint recognition methods, require individuals to touch or contact the biometric recognition device. This can be difficult for some individuals or during periods where users of such biometric recognition systems do not want to touch any surfaces that might have been contaminated by other individuals. Consequently, the use of such biometric recognition systems are shunned.

Consumers of such technologies typically seek a high level of performance with ease-of-use at a low cost. Because ease-of-use affects not only the end-users but also the operators who install and maintain the required equipment, the physical size of the biometric device is important. Owners of such equipment typically want small devices that conveniently fit into their buildings, vehicles and even their pockets. For example, iris recognition system operators desire the physical hardware to fit on door jambs, in existing infrastructure such as turnstiles or metal detectors, in laptops, in mobile devices, or the like.

It is well-known, however, with respect to iris recognition systems that a problem occurs when the infrared light sources required to illuminate human irises are placed too close to the infrared cameras that photograph the irises. Light leaving an illuminator and entering a subject's pupil travels along a first line. Light scattered from the eye tissue behind the pupil returns from the subject to a camera along a second line. If the angle between the first line and the second line is too small, light entering the pupil and reflecting from the retina at the back of the eye returns to the camera making the retina, as viewed through the pupil, appear bright. In standard photography, this undesirable effect is called red-eye or infrared-eye (collectively referred to as "red-eye") and is most common when the subject's pupils are dilated, for example in dim ambient light or in young subjects who tend to have large pupils. Red-eye can be largely suppressed by ensuring the angle between the first line and the second line exceeds 5 or 6 degrees. Even for subjects with large pupils, if the spacing between the center of the camera lens and the near edge of the light source is greater than about a tenth the distance from the camera to the subject, red-eye resulting from retinal reflection will not occur and the subject's pupils will appear black in a photograph.

Dark pupils allow conventional iris algorithms, that expect dark pupils, to operate accurately. Red-eye reduces the contrast between the pupil and iris making the boundary between them harder to define. As such, conventional iris cameras using conventional iris recognition algorithms prefer dark pupils. And therefore conventional iris cameras space their cameras and illuminators to guarantee the aforementioned design rule.

SUMMARY

Disclosed herein are methods, apparatus, and systems for iris recognition.

In implementations, a method for iris recognition includes acquiring, by an iris recognition device, at least two angularly differentiated iris images from a subject needing access, processing, by the iris recognition device, each of the at least two angularly differentiated iris images to generate at least one boundary delineated image from one of the at least two angularly differentiated iris images, applying, by the iris recognition device, image comparative analysis to the at least two angularly differentiated iris images to generate a boundary delineated image when the processing fails to produce the at least one boundary delineated image, segmenting and encoding, by the iris recognition device, one of the at least one boundary delineated image or the boundary delineated image to generate at least one iris template, matching, by the iris recognition device, the at least one iris template against an enrolled iris, and accepting, by the iris recognition device, the subject for access processing when the at least one iris template matches the enrolled iris.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 4 is a diagram of an example access control system with an example iris recognition device in accordance with implementations of this disclosure.

FIG. 5 is a diagram of an example iris recognition server for use with the access control system of FIG. 4 in accordance with implementations of this disclosure.

DETAILED DESCRIPTION

Figure 1:
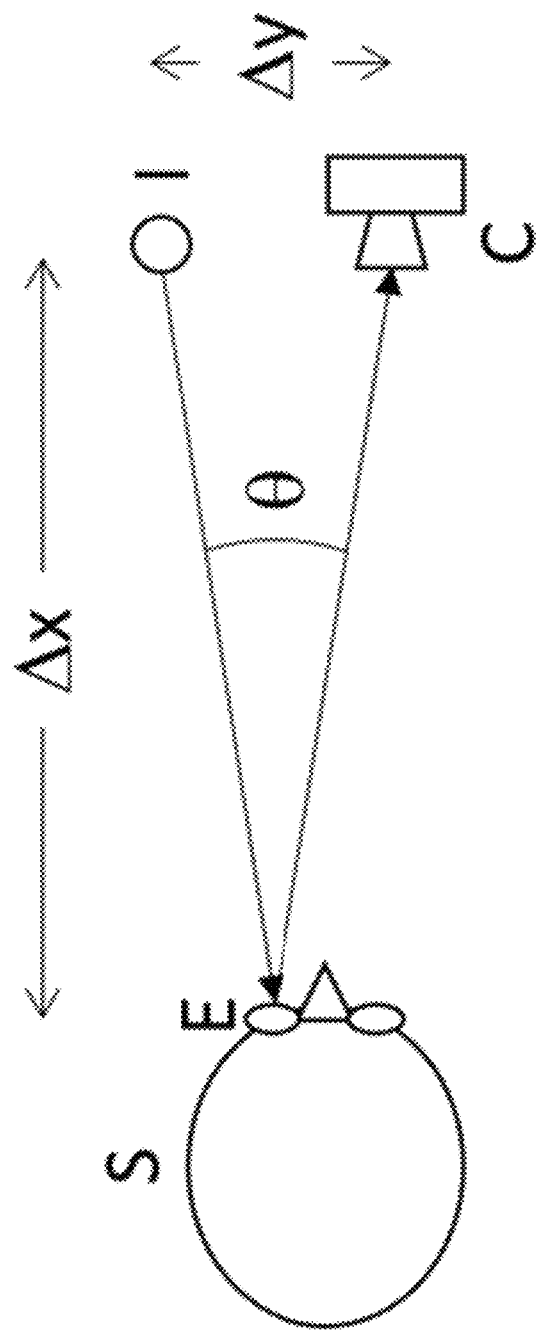
FIG. 1 is a diagram of an example geometrical relationship for iris recognition.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example geometrical relationship for iris recognition. A geometrical relationship is defined between a subject (S) and the subject's eye (E) with respect to an illuminator (I) and a camera (C) where Δx is distance between the subject S and the illuminator I and camera C, and Δy is the distance between the distance between the camera C and the illuminator I. Light leaving the illuminator I and entering a subject's pupil travels along a line I-E. Light scattered from the eye tissue behind the pupil returns from the subject to a camera along a second line E-C. If the angle θ between lines I-E and E-C is too small, light entering the pupil and reflecting from the retina at the back of the eye E returns to the camera C making the retina, as viewed through the pupil, appear bright (red-eye effect). Red-eye can be largely suppressed by ensuring the angle between lines I-E and E-C exceeds 5 or 6 degrees. As a rule of thumb, even for subjects with large pupils, if the spacing between the center of the camera lens and the near edge of the light source is at least a tenth of the distance from the camera to the subject, significant red-eye resulting from retinal reflection will not occur and the subject's pupils will appear black in a photograph.

Figure 2C:
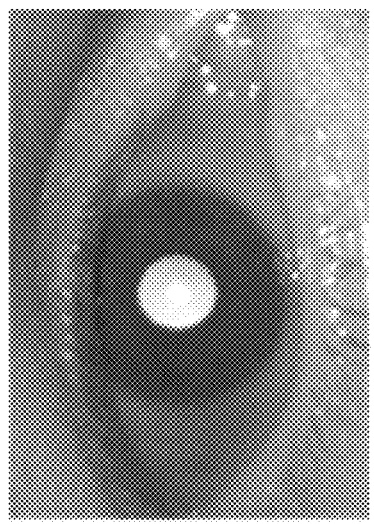
FIGS. 2A-2C are diagrams of example iris images.
Figure 2B:
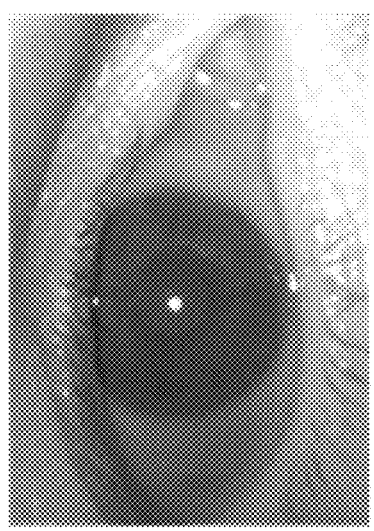
Figure 2A:
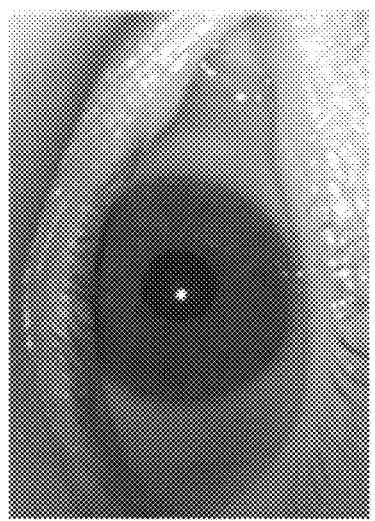

For camera-illuminator arrangements with an angle θ<5 degrees, the amount of retinal reflection that causes pupil brightening varies dramatically with pupil size, between subjects, and even across the pupil of a given subject. In such an arrangement, the brightness of a pupil can range from black (no infrared light returning to camera) to white (lots of infrared light returning to the camera). FIGS. 2A-2C are diagrams of example iris images. FIG. 2A shows a black pupil from which there is little or no reflection, FIG. 2C shows a white pupil from which there is substantial reflection, and FIG. 2B shows an intermediate gray shade pupil. The gray shaded pupil is difficult to distinguish from the surrounding iris tissue.

Iris recognition techniques discriminate the iris from the other parts of the eye. The pupil within the iris and the sclera, eyelids and eyelashes surrounding or covering the iris must be carefully delineated to isolate the iris and the unique texture imprinted on it. If the pupil is much brighter (or darker) than the iris, for example as shown in FIG. 2A and FIG. 2C, the boundaries of the pupil are easily delineated. However, if the retinal reflection reduces the contrast between the pupil and the iris, for example as shown in FIG. 2B, the iris-pupil boundary becomes difficult to accurately determine and iris recognition accuracy suffers. A conventional solution to suppress infrared-eye effects in iris recognition devices is to maintain a distance between the illuminator and camera of at least one-tenth of the furthest distance at which irises are to be identified. For example, for iris recognition at 100 cm, ensure that the camera-illuminator spacing is at least 10 cm or about 4 inches.

The conventional solutions do not work or are not applicable when the iris recognition device for 100 cm iris recognition is required to be less than 10 cm in any dimension. It is also not applicable if the entire iris recognition device operating at 100 cm must be smaller than 5 cm×2 cm. Under such requirements, the iris images would suffer infrared-eye in some subjects and the algorithms that segment iris texture by determining the iris-pupil boundary, one component in iris recognition, would lose accuracy. Thus, there is a tension between requirements on biometric performance and ease-of-use (as perceived by the operator of the equipment who might prefer a device of small size.)

Described herein are methods, apparatus, and systems for iris recognition. An iris recognition system exploits the strong dependence of pupil shade (brightness of retinal reflection) on the angle between an illuminator-eye line and an eye-camera line when that angle is ≤5°. The iris recognition system can have a small size with an acceptable iris recognition performance at a distance greater than ten times the characteristic device size. In implementations, the device size is in the approximate order of 10 cm in any dimension. In implementations, the device size is smaller than a device measuring approximately 5 cm×2 cm. Consequently, the decrease in biometric performance caused by infrared-eye artifacts that occur in small iris recognition devices is mitigated or eliminated.

In implementations, the iris recognition system provides a method for discriminating the pupils in a human eye from the surrounding iris tissue using lighting techniques. The method is valuable when system hardware requirements equate to a physically small device as compared to conventional devices. The method allows compact placement of light sources and recording devices such as cameras without regard to infrared-eye effects. Instead of attempting to suppress infrared-eye effects, the method exploits infrared-eye effects to finely define the border of the found pupil, permit the source of near infrared light used for iris recognition to be placed close to the recording device promoting compact device design, and operate in synergy with other tasks including optical ranging, face recognition, and anti-spoofing.

In implementations, the iris recognition system provides a method and system that allow accurate iris-pupil segmentation (delineation of the boundary between iris and pupil) even when the spacing (ΔY in FIG. 1) of the near infrared illuminator and iris camera are less than a tenth the distance between the camera and the subject's eye. The iris recognition system can accurately detect the contrast between iris and pupil even in the case of retinal reflection in which a pupil is brightened resulting in decreased iris-pupil contrast. The iris recognition system disregards the rule of thumb regarding the spacing of the illuminators and camera, which can result in relatively large devices, especially for devices in which the distance to the subject's eye is large, e.g., 100 cm. The iris recognition system provides a means to delineate the iris-pupil boundary despite its relatively small size and in view of infrared-eye effects.

In implementations, an iris recognition device can be mounted in space restricted devices, structures, or places. For example, the iris recognition device can be mounted on the bezel of a laptop or built into the jamb of a door. Removal of the constraint to suppress infrared-eye effects allows the iris recognition device to be smaller than the previous design rule that dictated the minimum size of the device to exceed one tenth of the distance between the camera and the subject.

In implementations, the iris recognition device can be an authentication module that installs within a small bezel of a laptop screen. The module can be approximately 1 cm (or less)×5 cm (or less) and could accurate iris-identify a user at distances to at least 80 cm. In implementations, the module can be 0.8 cm×3 cm and could still identify users at least 80 cm away. In implementations, the module can be used in a point-of-sale device in place of a card reader in which a customer is authenticated by an iris. In implementations, the device or module can allow access to an object, logical access, or that enable financial transactions.

Figure 3:
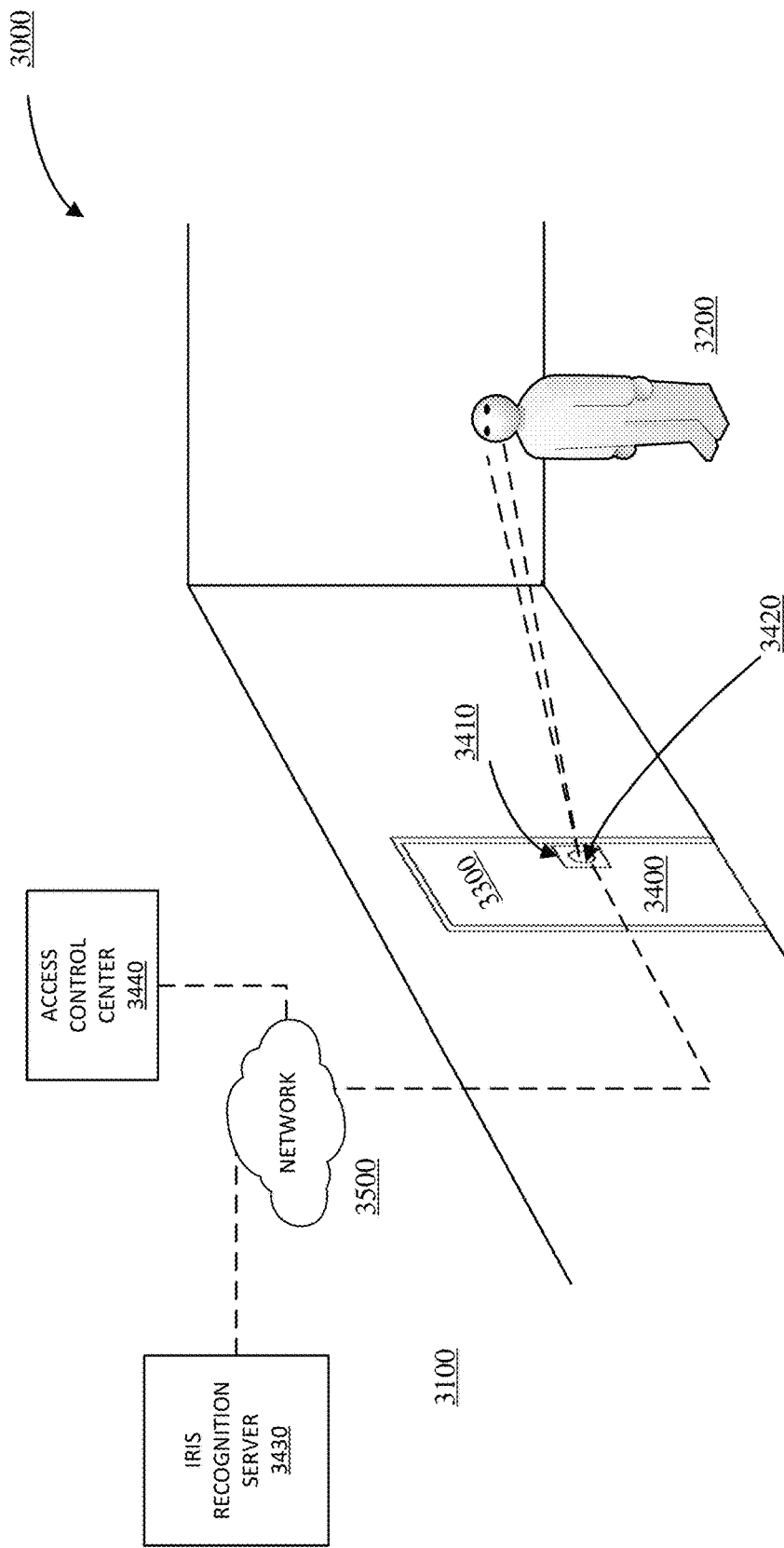
FIG. 3 is a diagram of an example architecture for iris recognition in accordance with implementations of this disclosure.

FIG. 3 is a diagram of an example architecture or system 3000 for iris recognition in accordance with implementations of this disclosure. In implementations, the architecture or system 3000 can be deployed, provided, or implemented in warehouses, offices, buildings, residences, hospitals, nursing homes, rehabilitation centers, vaults, airports, concerts, and other facilities or events. In implementations, the architecture 3000 can include a room or building 3100, which is accessed by a user 3200 via a door 3300. The door 3300 is illustrative of an access controlled facility, object, and the like (collectively "access controlled entity"). The door 3300 can be opened or unlocked by an access control system 3400. In implementations, the access control system 3400 includes an iris recognition device 3410 and an access control module 3420. In implementations, the access control system 3400 includes the iris recognition device 3410, the access control module 3420, and an iris recognition server 3430. In implementations, the access control system 3400 includes the iris recognition device 3410, the access control module 3420 and an access control center 3440. In implementations, the access control system 3400 includes the iris recognition device 3410, the access control module 3420, the iris recognition server 3430, and the access control center 3440. In implementations, the iris recognition device 3410, the access control module 3420, the iris recognition server 3430, and the access control center 3440, as appropriate and applicable, are connected or in communication (collectively "connected") using a network 3500. The architecture 3000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The iris recognition device 3410 is a touchless and contactless device for recognizing a user. The iris recognition device 3410 captures one or more images of the user 3000. The one or more images include an eye comprising an iris and a pupil. The iris recognition device 3410 can differentiate and segment the iris from the pupil. Iris templates are formed from the encoded information. The iris templates are matched against enrolled iris templates to determine if the user 3000 has access. An access signal is generated based on the results of the matching. In an implementation, the iris recognition device 3410 is a standalone device. In an implementation, the iris recognition device 3410 can communicate with the iris recognition server 3430 and the access control center 3440 to collectively determine access based on the matching results. The iris recognition device 3410 is sized irrespective of red-eye considerations. The camera and illuminator components in the iris recognition device 3410 are spaced irrespective of red-eye considerations.

The access control module 3420 can receive the access signal from the iris recognition device 3410. The access control module 3420 can open or unlock the door 3300 based on the access signal. In implementations, the access control module 3420 can send a signal to a lock/unlock device (not shown) on the door 3300 to open or unlock. In implementations, the access control module 3420 can receive the access signal from the access control center 3440. In implementations, the access control module 3420 can receive the access signal from the iris biometric recognition server 3430. In implementations, the access control module 3420 can receive the access signal from a combination of the iris recognition device 3410, the iris recognition server 3430, and the access control center 3440. In implementations, the access control module 3420 is integrated with the iris recognition device 3410. In implementations, the access control module 3420 is integrated with the door 3300. In implementations, the access control module 3420 is a standalone device in communication with the iris recognition device 3410, the door 3300, the iris recognition server 3430, the access control center 3440, or combinations thereof.

The iris recognition server 3430 can receive captured images from the iris recognition device 3410. The iris recognition server 3430 can perform iris recognition as described herein for the iris recognition device 3410. The iris recognition server 3430 can communicate results to the iris recognition device 3410, the access control module 3420, the access control center 3440, or combinations thereof.

The access control center 3440 can be smart monitors, smartphones, computers, desktop computers, handheld computers, personal media devices, notebooks, notepads, tablets, and the like which can communicate between the iris recognition device 3410, the access control module 3420, the iris recognition server 3430, or combinations thereof. The access control center 3440 can review the results from the matching by the iris recognition device 3410, the iris recognition server 3430, or combinations thereof to determine what access signal should be sent to the access control module 3420.

The network 3500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

FIG. 4 is a diagram of an example access control system 4000 with an example iris recognition device 4100 in accordance with implementations of this disclosure. The access control system 4000 can include the iris recognition device 4100 in communication with an access control module 4200. The iris recognition device 4100 can include an iris recognition module 4110, a reference database 4120, a detection module 4130, one or more image capturing device(s) 4140, one or more illuminator(s) 4150, and a controller 4160. In implementations, the iris recognition device 4100 can include an iris enrollment system 4170. In implementations, the iris recognition device 4100 and the access control module 4200 can be an integrated device. In implementations, the iris recognition device 4100 and the access control module 4200 can be connected standalone devices. The iris recognition device 4100 is sized irrespective of red-eye considerations. The one or more image capturing device(s) 4140 and the one or more illuminator(s) 4150 in the iris recognition device 4100 are spaced irrespective of red-eye considerations. The access control system 4000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The detection module 4130 can be a motion sensor, a proximity sensor, and like device which can determine the presence of an individual or whether an individual is proximate to an access controlled entity. The detection module 4130 can awaken or signal the access control system 4000, the iris recognition device 4100, or combinations thereof of the presence of the individual. In implementations, the access control system 4000 can be in a low power mode or on persistently to perform scanning. Activation of the access control system 4000 occurs when the scanning finds a scannable object.

The one or more image capturing device(s) 4140 can be a camera, an imager, or like device for capturing one or more images of the individual. In implementations, the one or more image capturing device(s) 4140 is a near infrared image capturing device, a visible image capturing device, or combinations thereof.

The one or more illuminator(s) 4150 can be one or more light sources, light emitting diodes, and the like which can illuminate the individual in coordination with capturing an image of the individual. In implementations, the one or more illuminator(s) 4150 can be visible light sources including ambient light, visible light emitting diodes (LEDs), near infrared light sources including ambient light, near infrared light emitting diodes (LEDs), and the like.

As stated, the one or more image capturing device(s) 4140 and the one or more illuminator(s) 4150 can be spaced in distance irrespective of red-eye considerations. Iris differentiation when one or more captured images suffer from red-eye effects can be overcome by providing at least one each of the one or more image capturing device(s) 4140 and the one or more illuminator(s) 4150 and at least one more of the one or more image capturing device(s) 4140 and the one or more illuminator(s) 4150. That is, one illuminator 4150 and two image capturing devices 4140, two illuminators 4150 and one image capturing device 4140, or two illuminators 4150 and two image capturing devices 4140.

The iris recognition module 4110 can perform iris recognition on the captured images as described herein. In implementations, the iris recognition module 4110 finds the eye, determines an iris-pupil boundary, performs a comparison if appropriate, encodes the iris(es) and generates appropriate or applicable iris templates, representations, or the like, and matches the iris templates to enrolled templates stored in the reference database 4120. The iris recognition module 4110 can send matching results to the access control module 4200. In implementations, the results can be scores, a decision, or combinations thereof.

The reference database 4120 can include iris templates, periocular region templates, and other like templates for individuals enrolled in the access control system 4000.

The controller 4160 can control and coordinate the operation of the detection module 4130, the image capturing device 4140, the one or more illuminator(s) 4150, and if applicable, the iris enrollment system 4170.

The iris enrollment system 4170 can enroll individuals into the access control system 4000. The one or more image capturing device(s) 4140 and the one or more illuminator(s) 4150 can capture images of individuals which are processed by the iris recognition module 4110 to generate iris templates. The iris templates can then be stored in the reference database 4120 for matching analysis by the iris recognition module 4110.

The access control module 4200 can receive matching results from the iris recognition device 4100. If a positive match occurs, the access control module 4200 can open or unlock the access controlled entity for the individual or send a signal to the access controlled entity, which in turn can cause the access controlled entity to open or unlock. In implementations, the access control module 4200 can access other security systems to determine security, access, authorization levels or the like for a matched individual. That is, the iris recognition is one of multiple steps in providing access to a secured asset.

FIG. 5 is a diagram of an example iris recognition server for use with the access control system of FIG. 4 in accordance with implementations of this disclosure. The iris recognition server 5000 can include an iris recognition module 5100, a reference database 5200, a controller 5300, and an iris enrollment system 5400. The iris recognition server 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The iris recognition server 5000 can communicate with the access control system 4000, the iris recognition device 4100, the access control module 4200, and combinations thereof via a network such as network 3500. The iris recognition module 5100 can operate as described for iris recognition module 4110. The reference database 5200 can operate as described herein for the reference database 4120. The controller 5300 can control and coordinate the operation of the iris recognition device 4100, the access control module 4200, the iris recognition module 5100, the reference database 5200, the iris enrollment system 5400, and combinations thereof.

FIGS. 6-9 are example illuminator and image capturing device configurations in accordance with implementations of this disclosure.

Figure 6:
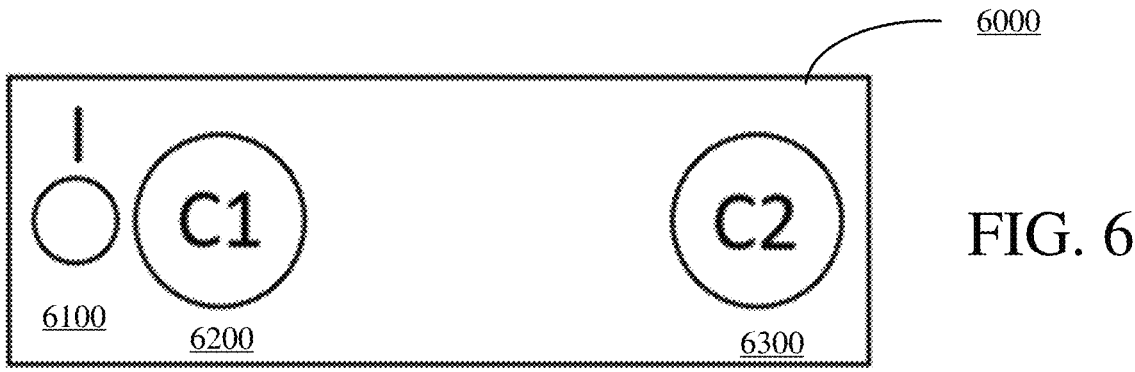
FIG. 6 is a diagram of an example configuration of an iris recognition device in accordance with implementations of this disclosure.

FIG. 6 is a diagram of an example configuration of an iris recognition device 6000 in accordance with implementations of this disclosure. The iris recognition device 6000 can include an illuminator 6100, a first image capturing device 6200, and a second image capturing device 6300. The spacing between the illuminator 6100, the first image capturing device 6200, and the second image capturing device 6300 are irrespective of red-eye considerations. For example, the iris recognition device 6000 can be 10 cm wide×2 cm high or 5 cm wide×1 cm tall or smaller, even if the angle □ for both I-C1 and I-C2 pairs is less than the prescribed 5 or 6 degrees. For example, the spacing between the illuminator 6100 and the first image capturing device 6200 can be less than 1 cm or less than 0.5 cm. For example, the spacing between the illuminator 6100 and the second image capturing device 6300 can be less than 10 cm or less than 5 cm or even less than 3 cm. In this configuration, the illuminator 6100 can flash once while the first image capturing device 6200 and the second image capturing device 6300 can capture near simultaneous or simultaneous images from different angles with respect to an eye of a subject. Iris and pupil differentiation is performed as described herein for captured images containing gray pupils. For example, the illuminator 6100 is 1 cm from the first image capturing device 6200 and 3 cm from the second image capturing device 6300.

A subject at 100 cm from the iris recognition device 6000 will suffer infrared-eye or red-eye because of the small angles formed by a line from the illuminator 6100 to the subject's pupil (I-E) and each of lines from the pupil to the first image capturing device 6200 (E-C1) and the second image capturing device 6300 (E-C2). However, the differential iris-pupil contrast in the case of first image capturing device 6200 with the angle formed by I-E and E-C1 and in the case of the second image capturing device 3200 with the relatively larger angle formed by E-I and E-C2 will show up in the comparison of the captured images from the first image capturing device 6200 and the second image capturing device 6300. In fact, the largest differences between near simultaneously or simultaneously captured images of a subject's eye under infrared light from the illuminator will be the difference in pupil-iris contrast. Moreover, image comparisons will show the pupil even in the case of low but different contrast in each iris image.

In implementations, a comparison of the images by ratio or difference and delineation of the pupil-iris boundary can be performed. One way to delineate the pupil would be to superimpose the near simultaneously or simultaneously taken images using standard image processing techniques that ensure that common features of the two images align accurately. The intensities of the two images can then be scaled so that they are as similar as possible over the entirety of the image frame. Then, one image can be subtracted from the other image. Because the iris and surrounding area of the eye are illuminated by the same light source at the same time, the difference of the two image intensities is small except in the pupil because the angles described above are different for one camera and the other. Therefore, the difference in intensities over the area of the pupil would not be small. Differential iris-pupil contrast, in this case, is determined using angular disparity. Note that even in the case in which one iris image shows no pupil-iris contrast, the other iris image will show some contrast and the differential image will enable delineation of the pupil-iris boundary. The iris recognition device 6000 can therefore be a relatively small size and have components compactly arranged which will afford accurate biometric segmentation despite its small size relative to a device that completely suppresses infrared-eye.

In implementations, images from both cameras can be submitted to the encoder creating two iris templates, which are both submitted to the matcher. If one image has unacceptably small iris-pupil contrast and the effort to create an iris template from it fails, the other iris will necessarily show larger iris-pupil contrast because it is taken at a different angle and will typically produce an iris template that can be matched. In this approach, no image alignment and comparison is needed. Both cameras produce images and the system attempts to match one or both images, if both are useable.

Figure 7:
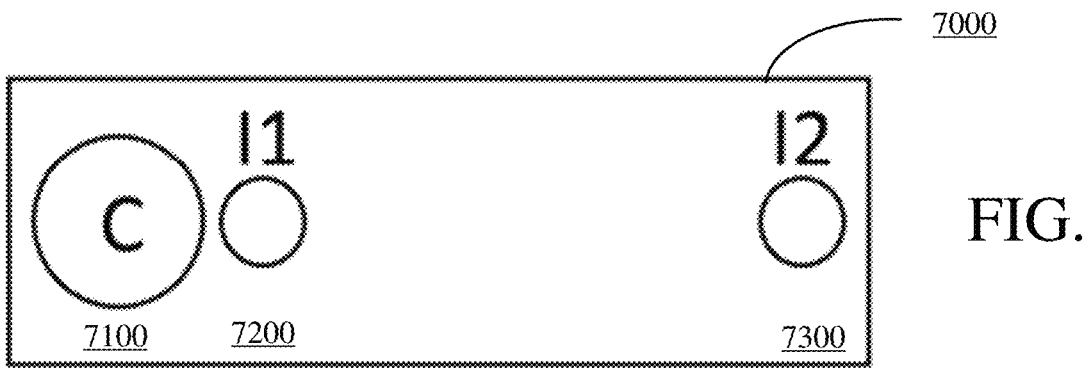
FIG. 7 is a diagram of an example configuration of an iris recognition device in accordance with implementations of this disclosure.

FIG. 7 is a diagram of an example configuration of an iris recognition device 7000 in accordance with implementations of this disclosure. The iris recognition device 7000 can include an image capturing device 7100, a first illuminator 7200, and a second illuminator 7300. The spacing between the image capturing device 7100, the first illuminator 7200, and the second illuminator 7300 are irrespective of red-eye considerations. For example, the iris recognition device 7000 can be 10 cm wide×2 cm high or 5 cm wide×1 cm tall or smaller, even if the angle □ for both I-C1 and I-C2 pairs is less than the prescribed 5 or 6 degrees. For example, the spacing between the image capturing device 7100 and the first illuminator 7200 can be less than 1 cm or less than 0.5 cm. For example, the spacing between the image capturing device 7100 and the second illuminator 7300 can be less than 10 cm or less than 5 cm or even less than 3 cm. In this configuration, the image capturing device 7100 can capture near simultaneous images from an eye of a subject following sequential flashes from the first illuminator 7200 and the second illuminator 7300. Iris and pupil differentiation is performed as described herein for captured images containing gray pupils. For example, the image capturing device 7100 is 1 cm from the first illuminator 7200 and 3 cm from the second illuminator 7300. A subject at 100 cm from the iris recognition device 7000 will suffer infrared-eye or red-eye because of the small angles formed by the lines from the first illuminator 7200 to the subject's pupil (I1-E), the second illuminator 7300 to the subject's pupil (I2-E), and the line from the image capturing device 7100 (E-C). In this instance, the first illuminator 7200 and the second illuminator 7300 are flashed at times separated by a short time interval so that the subject position is relatively unchanged while the image capturing device 7100 captures iris images at each flash. Similar to FIG. 6 description, the two captured images are compared and the differential iris-pupil contrast exploited to delineate the iris-pupil boundary. Differential iris-pupil contrast is determined using angular disparity, which can be measured or obtained by, for example, using ratio or difference comparisons. Note that even in the case in which one iris image shows no pupil-iris contrast, the other iris image will show some contrast and the differential image will enable delineation of the pupil-iris boundary. The iris recognition device 7000 can therefore be a relatively small size and have components compactly arranged which will afford accurate biometric segmentation despite its small size relative to a device that completely suppresses infrared-eye.

Figure 8:
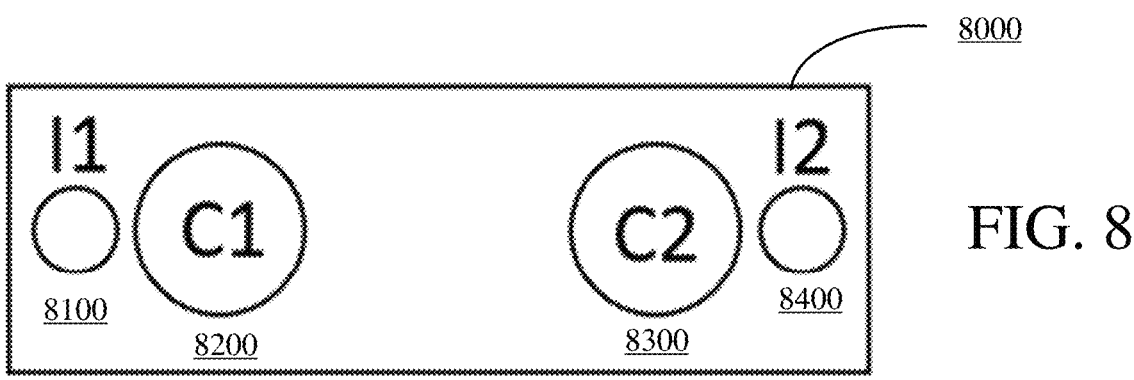
FIG. 8 is a diagram of an example configuration of an iris recognition device in accordance with implementations of this disclosure.

FIG. 8 is a diagram of an example configuration of an iris recognition device 8000 in accordance with implementations of this disclosure. The iris recognition device 8000 can include a first illuminator 8100, a first image capturing device 8200, a second image capturing device 8300, and a second illuminator 8400. The spacing between the first illuminator 8100, the first image capturing device 8200, the second image capturing device 8300, and the second illuminator 8400 are irrespective of red-eye considerations. For example, the iris recognition device 8000 can be 10 cm wide×2 cm high or 5 cm wide×1 cm tall or smaller, even if the angle □ or both I1-C1 and I1-C2 pairs and I2-C1 and I2-C2 pairs or is less than the prescribed 5 or 6 degrees. For example, the spacing between the first illuminator 8100 and the first image capture device 8200 as well as the spacing between the second camera 8300 and the second illuminator 8400 can be less than 1 cm or less than 0.5 cm. For example, the spacing between the first illuminator 8100 and the second image capture device 8300 and the spacing between the second image capture device 8200 and the second illuminator 8400 can be less than 10 cm or less than 5 cm or even less than 3 cm. For example, the spacing between the first illuminator 8100 and the second illuminator 8400 can be less than 10 cm or less than 5 cm or even less than 3 cm. In this configuration, the images can be captured as described with respect to FIG. 6 or FIG. 7, with the advantage of being able to work in either mode. Iris and pupil differentiation is performed as described herein for captured images containing gray pupils.

Figure 9:
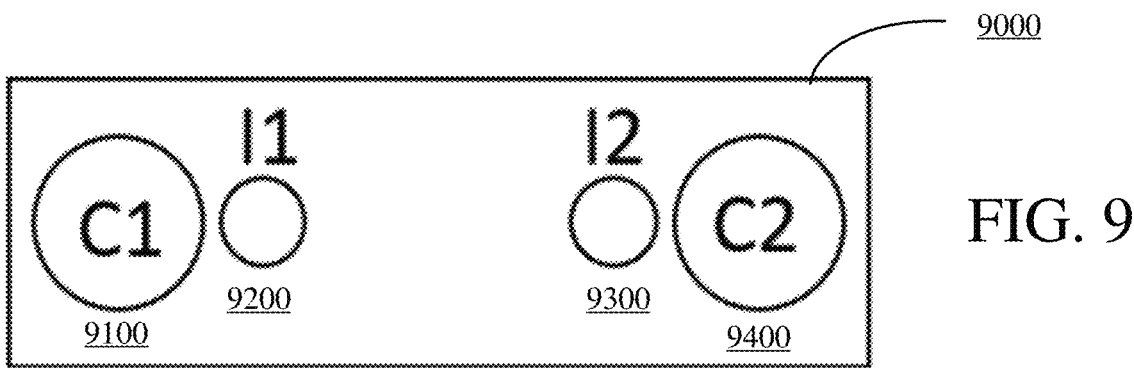
FIG. 9 is a diagram of an example configuration of an iris recognition device in accordance with implementations of this disclosure.

FIG. 9 is a diagram of an example configuration of an iris recognition device 9000 in accordance with implementations of this disclosure. The iris recognition device 9000 can include a first image capturing device 9100, a first illuminator 9200, a second illuminator 9300, and a second image capturing device 9400. The spacing between the first image capturing device 9100, a first illuminator 9200, a second illuminator 9300, and a second image capturing device 9400 are irrespective of red-eye considerations. For example, the iris recognition device 9000 can be 10 cm wide×2 cm high or 5 cm wide×1 cm tall or smaller, even if the angle □ for both I1-C1 and I1-C2 pairs and I2-C1 and I2-C2 pairs is less than the prescribed 5 or 6 degrees. For example, the spacing between first image capturing device 9100 and the first illuminator 9200 and second image capturing device 9400 and second illuminator 9300 can be less than 1 cm or less than 0.5 cm. For example, the spacing between first image capturing device 9100 and the second illuminator 9300 and second image capturing device 9300 and first illuminator 9200 can be less than 10 cm or less than 5 cm or even less than 3 cm. For example, the spacing between first image capturing device 9100 and the second image capturing device 9400 can be less than 10 cm or less than 5 cm or even less than 3 cm. In this configuration, the images can be captured as described with respect to FIG. 6 or FIG. 7, with the advantage of being able to work in either mode. Iris and pupil differentiation is performed as described herein for captured images containing gray pupils. Device arrangements of FIG. 8 and FIG. 9 provide options for hardware layout that might favor one or the other design dependent upon factors related to wiring, electrical or optical isolation, component size and/or geometry which determines device layout, and the like and combinations thereof.

In implementations, both images captured with respect to the configurations described herein can be submitted to the encoder creating two iris templates, which are both submitted to the matcher. If one image has unacceptably small iris-pupil contrast and the effort to create an iris template from it fails, the other iris will necessarily show larger iris-pupil contrast because it is taken at a different angle and will typically produce an iris template that can be matched. In this approach, no image alignment and comparison is needed. Both cameras produce images and the system attempts to match one or both images, if both are useable.

In implementations, High Dynamic Range (HDR) capabilities of a sensor can be used by timing a pulse to finish between a start of a first frame and a start of a second frame. For example, HDR processing of image data in a frame can result in a first image (from a first pass) with less blur but with less contrast and a second image (from a second pass) with more blur but better contrast or feature illumination. Using the technique described above with respect to FIG. 6, the two images can be compared and the differential iris-pupil contrast exploited to delineate the iris-pupil boundary or both images can be submitted to the encoder and the matcher. In this implementation, a near-infrared (NIR) illuminator can be used. Moreover, the resulting system can capture irises with lower intensity illumination with a longer pulse.

In implementations, a single illuminator and camera can be used where the illuminator can be configured to emit sequential flashes of different colors to provide differential contrast between iris and pupil when the single illuminator and camera are spaced irrespective of the red-eye effect. For example, the illuminator could emit a 780 nm flash, which would illuminate the subject's iris and an image could be captured, followed rapidly by a flash at 940 nm which would illuminate the subject's iris and a second image could be captured. Since the iris and the retina reflect differently at the two wavelengths, the two images would different iris-pupil contrast and could be subjected to the same analysis as described herein.

In implementations, two illuminators can be configured to emit flashes of different polarizations. If, due to physiology of either iris or retinal tissue, or both, the reflected light from the eye tissue differed in the two polarizations creating differential iris-pupil contrast, the two images would delineate iris-pupil boundaries and could be subjected to the same analysis as described herein.

In implementations, a single image capturing device can be used with specialized adaptation and a single LED. Using an image capturing device that can read one or more exposures during a pulse sequence designed to produce differential exposures in consecutive (or nearly consecutive) frames, the system can produce two differentially exposed frames. The brightness ratio of the pupil and iris tissue in these frames would be constant but the difference would depend on the absolute number of photons captured per pixel per exposure. By mathematical analysis, the differential brightness of the pupil (due to retinal reflection) could be distinguished using this system in a similar manner to the other techniques proposed. In this instance, the analysis can show a difference in black between a hole (pupil) and black print (spoof). Moreover, if the greyscale levels between the two different exposures change at the same rate as other elements of the texture then you have a spoof; if the pupil greyscale is significantly unchanged the likelihood is high that it is a real pupil.

Retinal reflection is an indicator of a live eye. Differential images can be used to gather the same type of information that allows liveness detection. A presentation spoof would respond differently to a live eye in two acquired images. The relative iris/pupil contrast in one image would be related to that in the other in an obvious way with a spoof, e.g., all features in one image would be fractionally brighter than in the other. However, for a live eye, the relationship would be different because the iris/pupil contrast is determined by the relative angles of illumination. By this means, a live eye can be sensed.

In implementations where two image capturing devices are used, stereoscopy can be used to determine the distance between the image capturing device pair and the subject's irises. With the measured distance, the system can be adjusted to produce improvements in the iris images that would in turn improve biometric performance. For example, with a relatively precise distance measurement, e.g. measure distances to ±5% or 10%, the iris image capturing device lenses can be adjusted to optimize focus. In implementations, the illuminator brightness can be optimized for image signal-to-noise ratio. In implementations, a zoom lens can be used to optimize the spatial resolution of the image capturing device in terms of number of pixels across the image of the iris.

In implementations, when two image capturing devices are used which have different spatial resolutions, adequately resolved iris images can be captured from both image capturing devices and an adequately resolved infrared face image with one image capturing device. For example, if one image capturing device comprised a 2 MPx image sensor and the other image capturing device comprised a 12 MPx image sensor, the lenses on each of the image capturing devices can be set to create images of properly resolved irises. But the 12 MPx camera would operate with an enlarged field of view that could capture an entire face image that, in turn, could feed a second in-built biometric system operating with face recognition software. Thus, the system would be bi-modal.

In implementations, differential pupil-iris contrast due to angular disparity (in both 2-image capturing device/1-LED and 1-image capturing device/2-LED implementations) gives indication of liveness of the subject's eye. A printed iris image, even one that includes a contact lens to produce realistic corneal reflection, will not show differential pupil-iris contrast and can therefore be discriminated as a spoof using the described iris recognition device. Thus, the iris recognition device has built-in anti-spoofing capabilities.

In implementations, when using an image capturing device with multiple exposure read capability and exploiting the various exposures that come from a pulse sequence designed to produce a variation in eye brightness, (1) select a frame of optimal signal-to-noise ratio and/or (2) build up an eye image of dynamic range extended beyond the native dynamic range of the sensor using standard techniques including the well-known pyramid method. An eye image of high dynamic range would contain additional iris texture information beyond a standard dynamic range image and would be advantageous in an iris recognition application.

In implementations, ideal illumination for each subject can be achieved by alternating the pulse duration and then sampling and retuning as appropriate. That is, images can be captured using multiple illumination levels and the best one(s) can be used for iris recognition.

Figure 10:
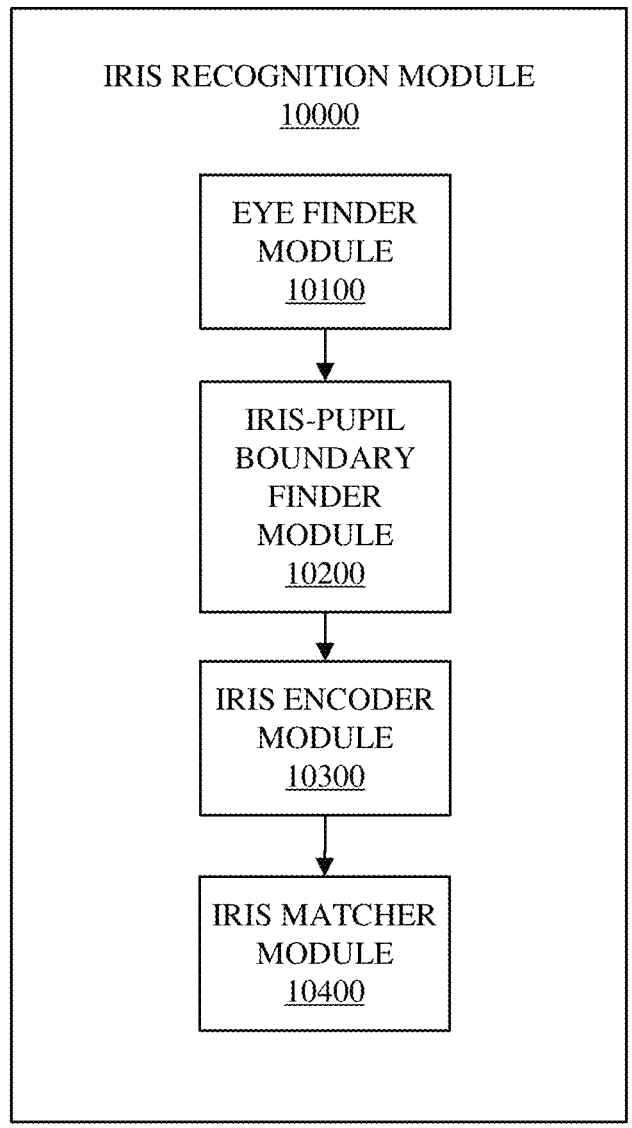
FIG. 10 is a diagram of an example iris recognition module in accordance with implementations of this disclosure.

FIG. 10 is a diagram of an example iris recognition module 10000 in accordance with implementations of this disclosure. In implementations, the iris recognition module 10000 is the iris recognition module 4110 in FIG. 4 and the iris recognition module 5100 in FIG. 5. The iris recognition module 10000 can include an eye finder module 10100, an iris-pupil boundary finder module 10200, an iris encoder module 10300, and an iris matcher module 10400.

The eye finder module 10100 can locate or find one or more eyes of a subject in images that contain at least an appropriate portion of a face of the subject. An appropriate portion can refer to having on or more landmarks to determine the one or more eyes of the subject.

The iris-pupil boundary finder module 10200 can operate on or process the located eyes to perform iris-pupil segmentation even under tough lighting conditions or small devices. In implementations, the iris-pupil boundary finder module 10200 can find an iris-pupil boundary in one of the two images or in both images using conventional techniques. In implementations, the iris-pupil boundary finder module 10200 can generate iris-pupil boundary defined image(s) or angularly different images for submission to the iris encoder module 10300. In implementations, the iris-pupil boundary finder module 10200 can compare or differentiate to find the iris-pupil boundaries on the located eyes. The iris-pupil boundary finder module 10200 compares two images to find that they are virtually identical except for the brightness of the pupil due to different amounts of retinal reflection (due to different angles formed by the placement of the illuminator(s) relative to the image capturing device(s) as described in FIGS. 6-9). The operation of comparison produces a result in which the pupil is the only region of the eye that shows a difference, thereby making the iris-pupil boundary easier to delineate. In implementations, the comparison can be done via subtraction or division. The iris-pupil boundary finder module 10200 can determine the differences in the two iris images to accurately delineate the pupil-iris boundary despite some red-eye or infrared-eye in each of the images. The iris-pupil boundary finder module 10200 can generate a boundary delineated image with the determined boundary using either of the captured images.

The iris encoder module 10300 can perform iris segmentation and encoding on the sent image(s) to generate a digitized iris template(s) using conventional techniques. The iris encoder module 10300 can perform iris segmentation using the image(s) sent by the iris-pupil boundary finder module 10200. In implementations, the iris encoder module 10300 can attempt to segment both of the angularly different images. At least one of the angularly different images will result in a successful iris segmentation. In implementations, the iris encoder module 10300 can segment the boundary delineated image. The iris encoder module 10300 can encode the segmented iris image(s) to generate a digitized iris template(s) using conventional techniques. In implementations, at least one of the angularly different images will result in a successful iris template. In implementations, the iris encoder module 10300 can encode the iris segmented, boundary delineated image.

The iris matcher module 10400 can compare the iris template(s) against iris enrolled templates and provide iris match scores. In implementations, the iris matcher module 10400 can compare both of the images from the angularly different images, if available. In implementations, the iris matcher module 5300 can provide results using a variety of known techniques.

Operationally, with reference to FIGS. 1-10, an individual 3200 self-aligns to a camera configuration as described herein in an iris recognition device. The camera(s), in conjunction with the illuminator(s) can produce a set of angularly differentiated images of the individual 3200. Each captured angularly differentiated image or frame is submitted for eye location determination. Generation of an iris-pupil boundary can be attempted for each located eye. In implementations, iris-pupil boundaries are generated for both angularly differentiated images using conventional techniques to generate boundary delineated images. In implementations, an iris-pupil boundary can be determined by an image comparative analysis. Pupil area can be identified by differential contrast between the two angularly differentiated images. An iris-pupil boundary can be determined based on the pupil area determination. The determined iris-pupil boundary can then be applied to one of the angularly differentiated images to generate a boundary delineated image. Segmentation and encoding of the boundary delineated images or the boundary delineated image, as appropriate, can be performed to generate iris template(s). In implementations, at least one of the boundary delineated images can result in an iris template. The iris template(s) can be matched against enrolled irises.

Figure 11:
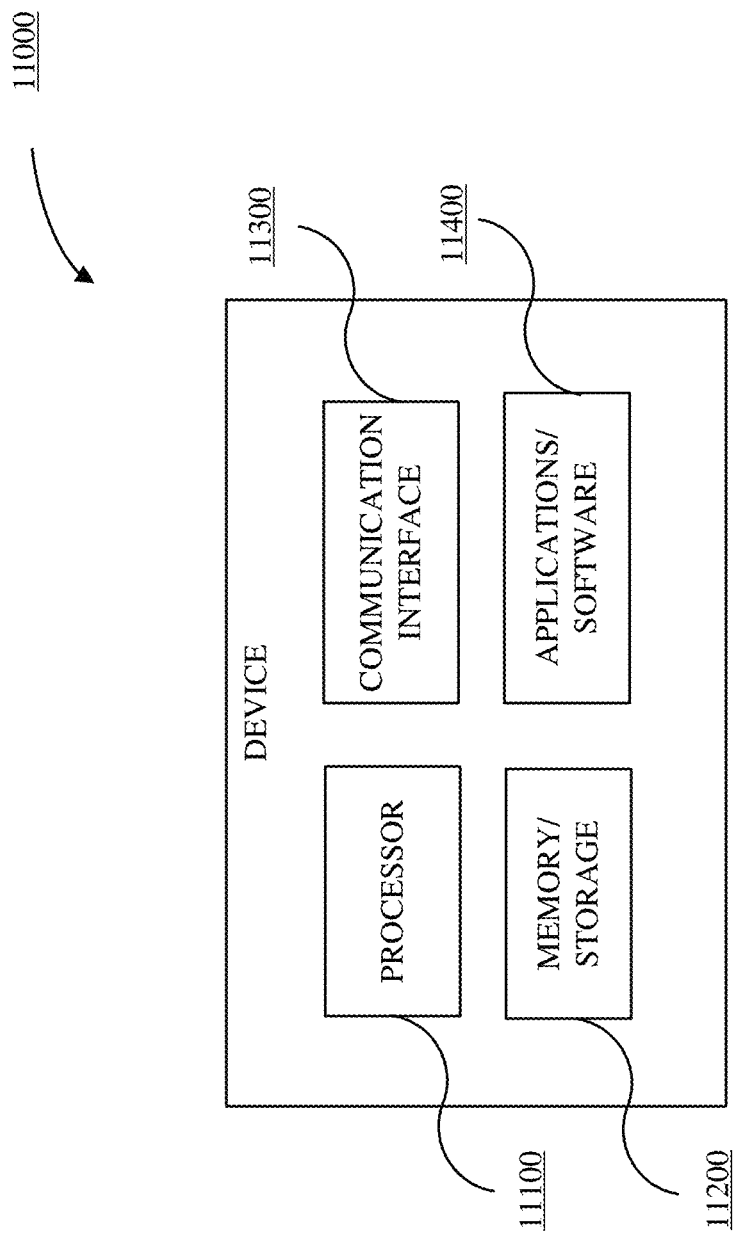
FIG. 11 is a block diagram of an example of a device in accordance with implementations of this disclosure.

FIG. 11 is a block diagram of an example of a device 11000 in accordance with embodiments of this disclosure. The device 11000 may include, but is not limited to, a processor 11100, a memory/storage 11200, a communication interface 11300, and applications 11400. The device 11000 may include or implement, for example, the access control system 3400, the iris recognition device 3410, the access control module 3420, the iris recognition server 3430, the access control center 3440, the access control system 4000, the iris recognition device 4100, the access control module 4200, the iris recognition module 4110, the reference database 4120, the detection module 4130, the one or more image capturing device(s) 4140, the one or more illuminator(s) 4150, the controller 4160, the iris enrollment system 4170, the iris recognition server 5000, the iris recognition module 5100, the reference database 5200, the controller 5300, the iris enrollment system 5400, the iris recognition module 10000, the iris finder module 10100, the iris encoder module 10200, and the iris matcher module 10300, for example. In an implementation, appropriate memory/storage 11200 may store the image(s), the iris information, the iris template(s), iris match scores, and the list of matched scores. In an implementation, appropriate memory/storage 11200 is encoded with instructions for at least iris recognition and access control. The iris recognition techniques or methods described herein may be stored in appropriate memory/storage 11200 and executed by the appropriate processor 11100 in cooperation with the memory/storage 11200, the communications interface 11300, and applications 11400, as appropriate. The device 11000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 12:
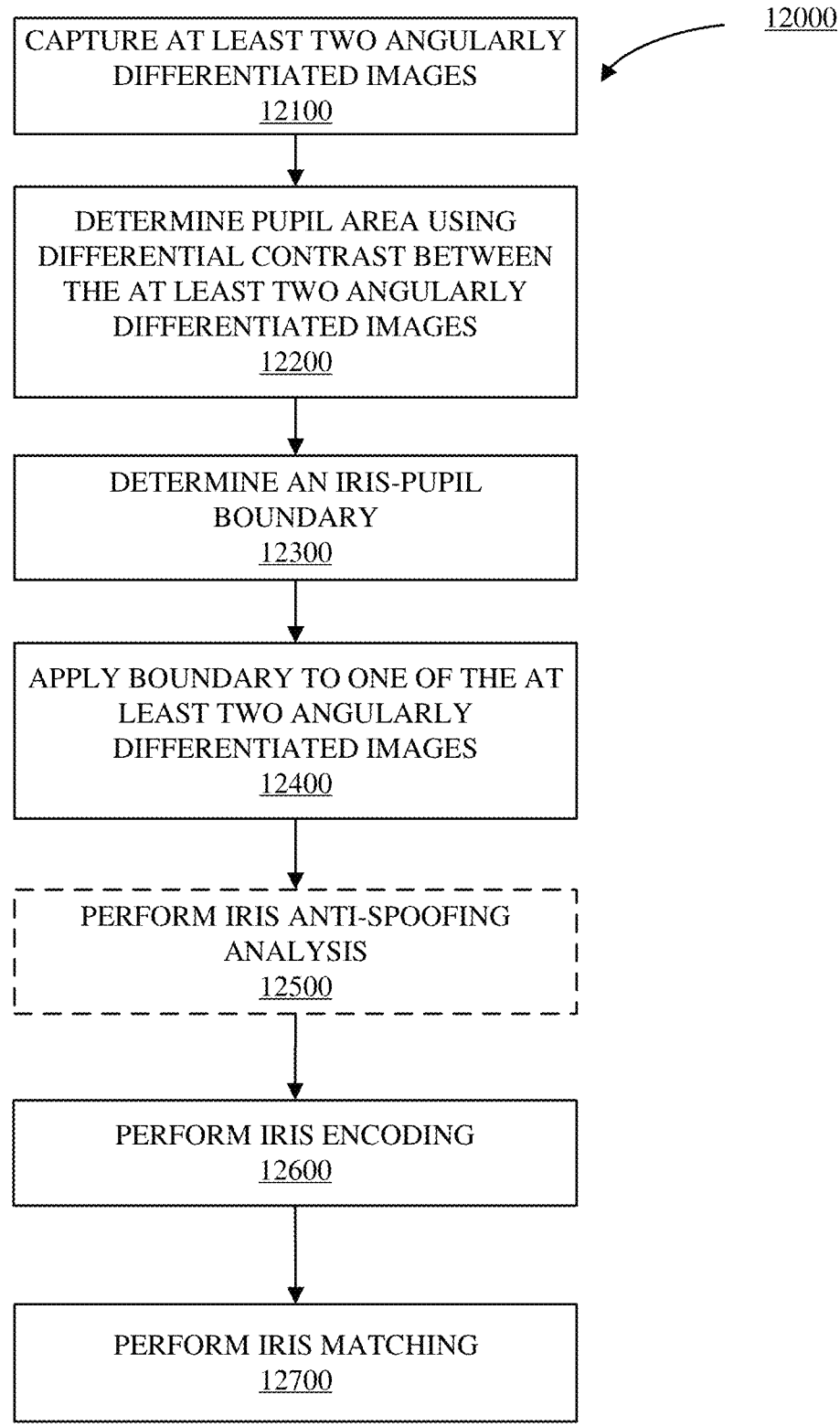
FIG. 12 is a flowchart of an example method for iris recognition in accordance with embodiments of this disclosure.
Figure 13:
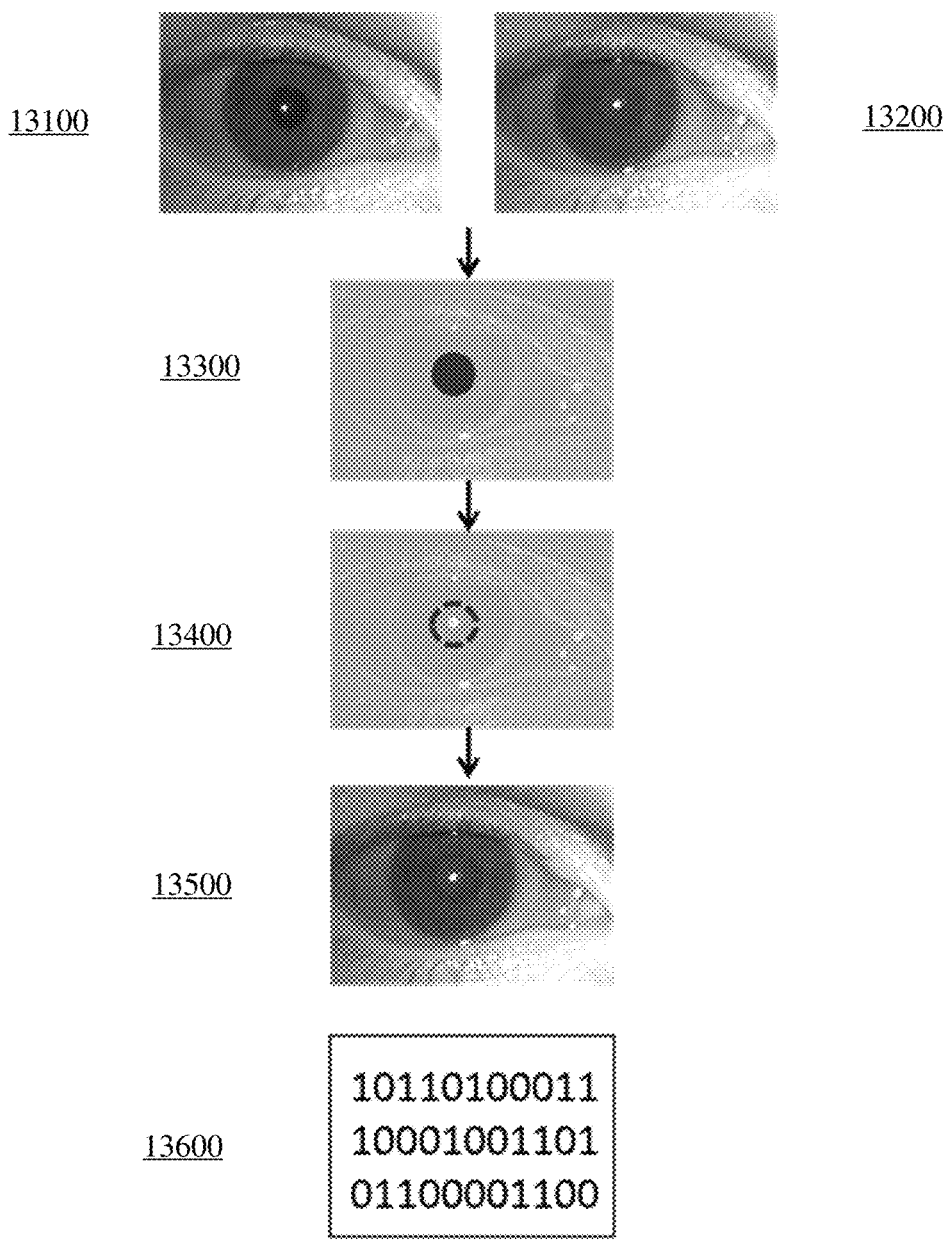
FIG. 13 is a diagram of example iris images for iris recognition in accordance with implementations of this disclosure.

FIG. 12 is a flowchart of an example method 12000 for iris recognition in accordance with embodiments of this disclosure. FIG. 13 are example diagrams associated with the FIG. 12 method 12000 for iris recognition in accordance with embodiments of this disclosure. The method 12000 includes: capturing 12100 at least two angularly differentiated images of a subject; determining 12200 pupil area using differential contrast between the at least two angularly differentiated images; determining 12300 an iris-pupil boundary; applying 12400 the iris-pupil boundary to one of the at least two angularly differentiated images; performing 12500 iris anti-spoofing analysis; performing 12600 iris encoding; and performing 12700 iris matching. In implementations, the order of operations, for example, anti-spoof analysis can be performed before or after matching, and/or can be tailored to the specific implementation to favor speed or accuracy as needed. For example, the method 12000 may be implemented, as applicable and appropriate, by the architecture or system 3000 of FIG. 3, the access control system 3400 of FIG. 3, the iris recognition device 3410 of FIG. 3, the access control module 3420 of FIG. 3, the iris recognition server 3430 of FIG. 3, the access control center 3440 of FIG. 3, the access control system 4000 of FIG. 4, the iris recognition device 4100 of FIG. 4, the access control module 4200 of FIG. 4, the iris recognition module 4110 of FIG. 4, the reference database 4120 of FIG. 4, the detection module 4130 of FIG. 4, the image capturing device 4140 of FIG. 4, the one or more illuminator(s) 4150 of FIG. 4, the controller 4160 of FIG. 4, the iris enrollment system 4170 of FIG. 4, the iris recognition server 5000 of FIG. 5, the iris recognition module 5100 of FIG. 5, the reference database 5200 of FIG. 5, the controller 5300 of FIG. 5, the iris enrollment system 5400 of FIG. 5, the iris recognition module 10000 of FIG. 10, the eye finder module 10100 of FIG. 10, the iris-pupil boundary finder module 10200 of FIG. 10, the iris encoder module 10300 of FIG. 10, the iris matcher module 10400 of FIG. 10, and the device 11100 of FIG. 11.

The method 12000 includes capturing 12100 at least two angularly differentiated images of a subject. An iris recognition device or system can include illuminator and camera configurations as described herein to generate at least two differential images. The at least two differential images can include, but is not limited to, angularly differentiated images, wavelength or frequency differentiated images, polarization differentiated images, exposure differentiated images, and the like. The description of the method 12000 uses angularly differentiated images but is applicable to any two differential images without impacting the scope of the description and/or the claims. FIG. 13 shows two angularly differentiated images 13100 and 13200.

The method 12000 includes determining 12200 pupil area using differential contrast between the at least two angularly differentiated images. A differential contrast analysis is performed on two angularly differentiated images to determine a pupil area. FIG. 13 shows a pupil area 13300 after performing differential contrast analysis.

The method 12000 includes determining 12300 an iris-pupil boundary. The iris-pupil boundary is determined using the determined pupil area. FIG. 13 shows an iris-pupil boundary 13400 using the pupil area.

The method 12000 includes applying 12400 the iris-pupil boundary to one of the at least two angularly differentiated images. The iris-pupil boundary is then applied to one of the at least two angularly differentiated images to segment the iris and the pupil. FIG. 13 shows application of the iris-pupil boundary to one of the images to form a boundary delineated image 13500.

The method 12000 includes performing 12500 iris anti-spoofing analysis. As noted, anti-spoofing analysis can be performed at any time in the iris recognition method to determine liveness, contact lens spoofing, and other spoofing techniques.

The method 12000 includes performing 12600 iris encoding. Segmentation and encoding, may include detecting the iris-sclera boundary by conventional means, is performed despite the gray pupil and the information is used to create a digital iris template as described herein using conventional techniques. FIG. 13 shows encoding 13600 of the boundary delineated image 13500.

The method 12000 includes performing 12700 iris matching. The iris template is compared to iris(es) in an enrollment database to find a match as described herein using conventional techniques.

Figure 14:
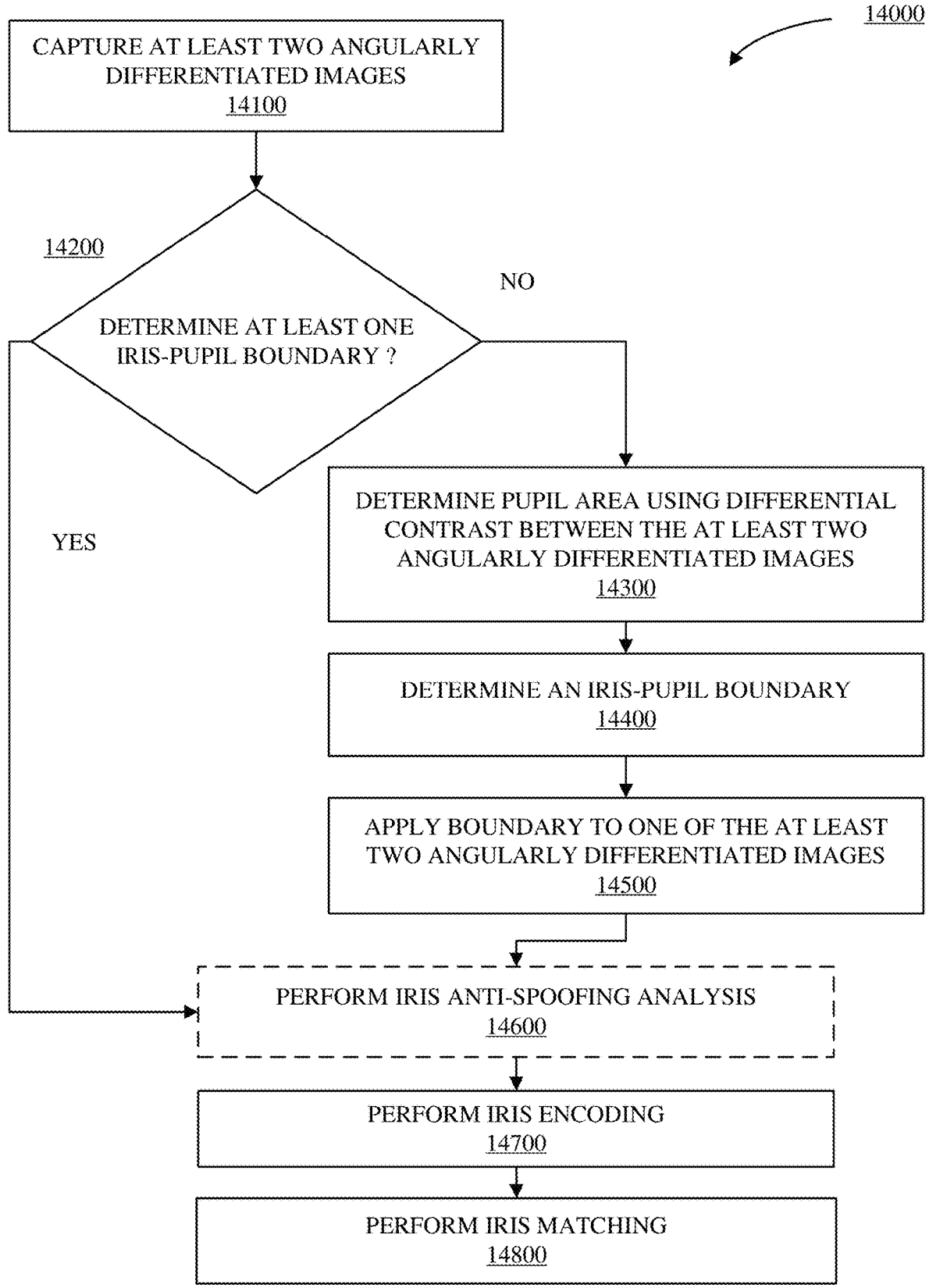
FIG. 14 is a flowchart of an example method for iris recognition in accordance with embodiments of this disclosure.

FIG. 14 is a flowchart of an example method 14000 for iris recognition in accordance with embodiments of this disclosure. The method 14000 includes: capturing 14100 at least two angularly differentiated images of a subject; determining 14200 at least one iris-pupil boundary; if no iris-boundary pupils found, determining 14300 pupil area using differential contrast between the at least two angularly differentiated images; determining 14400 an iris-pupil boundary; applying 14500 the iris-pupil boundary to one of the at least two angularly differentiated images; performing 14600 iris anti-spoofing analysis; performing 14700 iris encoding; and performing 14800 iris matching. In implementations, the order of operations, for example, anti-spoof analysis can be performed before or after matching, and/or can be tailored to the specific implementation to favor speed or accuracy as needed. For example, the method 14000 may be implemented, as applicable and appropriate, by the architecture or system 3000 of FIG. 3, the access control system 3400 of FIG. 3, the iris recognition device 3410 of FIG. 3, the access control module 3420 of FIG. 3, the iris recognition server 3430 of FIG. 3, the access control center 3440 of FIG. 3, the access control system 4000 of FIG. 4, the iris recognition device 4100 of FIG. 4, the access control module 4200 of FIG. 4, the iris recognition module 4110 of FIG. 4, the reference database 4120 of FIG. 4, the detection module 4130 of FIG. 4, the image capturing device 4140 of FIG. 4, the one or more illuminator(s) 4150 of FIG. 4, the controller 4160 of FIG. 4, the iris enrollment system 4170 of FIG. 4, the iris recognition server 5000 of FIG. 5, the iris recognition module 5100 of FIG. 5, the reference database 5200 of FIG. 5, the controller 5300 of FIG. 5, the iris enrollment system 5400 of FIG. 5, the iris recognition module 10000 of FIG. 10, the eye finder module 10100 of FIG. 10, the iris-pupil boundary finder module 10200 of FIG. 10, the iris encoder module 10300 of FIG. 10, the iris matcher module 10400 of FIG. 10, and the device 11100 of FIG. 11.

The method 14000 includes capturing 14100 at least two angularly differentiated images of a subject. An iris recognition device or system can include illuminator and camera configurations as described herein to generate at least two differential images. The at least two differential images can include, but is not limited to, angularly differentiated images, wavelength or frequency differentiated images, polarization differentiated images, exposure differentiated images, and the like. The description of the method 12000 uses angularly differentiated images but is applicable to any two differential images without impacting the scope of the description and/or the claims. FIG. 13 shows two angularly differentiated images 13100 and 13200.

The method 14000 includes determining 14200 at least one iris-pupil boundary. Iris-pupil boundaries need to be determined for iris recognition. Initially, an iris-pupil boundary is determined for each angularly differentiated image using conventional techniques. If at least one iris-pupil boundary is determinable and a boundary delineated image is generated, then proceed to process the boundary delineated image. Otherwise, use the differential comparative method.

The method 14000 includes determining 14300 pupil area using differential contrast between the at least two angularly differentiated images when iris-pupil boundary is not conventionally determinable. A differential contrast analysis is performed on two angularly differentiated images to determine a pupil area. FIG. 13 shows a pupil area 13300 after performing differential contrast analysis.

The method 14000 includes determining 14400 an iris-pupil boundary. The iris-pupil boundary is determined using the determined pupil area. FIG. 13 shows an iris-pupil boundary 13400 using the pupil area.

The method 14000 includes applying 14500 the iris-pupil boundary to one of the at least two angularly differentiated images. The iris-pupil boundary is then applied to one of the at least two angularly differentiated images to segment the iris and the pupil. FIG. 13 shows application of the iris-pupil boundary to one of the images to form a boundary delineated image 13500.

The method 14000 includes performing 14600 iris anti-spoofing analysis. As noted, anti-spoofing analysis can be performed at any time in the iris recognition method to determine liveness, contact lens spoofing, and other spoofing techniques.

The method 14000 includes performing 14700 iris encoding. Segmentation and encoding including detecting the iris-sclera boundary by conventional means is completed on the boundary delineated image(s) despite the gray pupil and the information is used to create a digital iris template.

The method 14000 includes performing 14800 iris matching. The iris template(s) is compared to iris(es) in an enrollment database to find a match.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for iris recognition, the method comprising:
    acquiring, by an iris recognition device, at least two differentially lighted iris images from a subject to be recognized, wherein a light intensity of a pupil area in each of the at least two differentially lighted iris images varies between the at least two differentially lighted iris images;
    delineating, by the iris recognition device, an iris-pupil boundary by comparing a pupil area from one of the at least two differentially lighted iris images with another pupil area from another of the at least two differentially lighted iris images to generate a boundary delineated image;
    segmenting and encoding, by the iris recognition device, the boundary delineated image to generate at least one iris template;
    matching, by the iris recognition device, the at least one iris template against an enrolled iris; and
    accepting, by the iris recognition device, the subject for access processing when the at least one iris template matches the enrolled iris.

2. The method of claim 1, wherein the iris recognition device includes a combination of at least one image capturing device and at least one illuminator, further comprising:
    spacing the at least one image capturing device and the at least one illuminator irrespective of redeye effects.

3. The method of claim 1, wherein the delineating further comprising:
    applying, by the iris recognition device, image comparative analysis to the at least two differentially lighted iris images to generate the boundary delineated image.

4. The method of claim 1, wherein the delineating further comprising:
    performing, by the iris recognition device, a ratio comparative analysis between the at least two differentially lighted iris images to generate the boundary delineated image.

5. The method of claim 1, wherein the delineating further comprising:
    performing, by the iris recognition device, a difference analysis between the at least two differentially lighted iris images to generate the boundary delineated image.

6. The method of claim 1, further comprising:
    applying, by the iris recognition device, anti-spoofing techniques to at least one of the at least differentially lighted iris images or the boundary delineated image.

7. The method of claim 1, wherein a size of the iris recognition device is in an approximate order of 10 cm or less in any dimension from a distance of approximately 1 meter between the device and the subject.

8. An iris recognition device comprising:
    at least one illuminator;
    at least one image capturing device configured to cooperatively work with the at least one illuminator to capture at least two differentially lighted iris images for a subject to be recognized, wherein the at least one illuminator cooperatively works with the at least one image capturing device, and wherein the at least one illuminator and the at least one image capturing device are spaced irrespective of redeye effects; and
    an iris recognition module configured to:
        delineate an iris-pupil boundary by comparing a pupil area from one of the at least two differentially lighted iris images with another pupil area from another of the at least two differentially lighted iris images to generate a boundary delineated image;
        segment and encode the boundary delineated image to generate at least one iris template;
        match the at least one iris template against an enrolled iris; and
        accept the subject for access processing when the at least one iris template matches the enrolled iris.

9. The iris recognition device of claim 8, wherein the iris recognition module is further configured to:
    apply image comparative analysis to the at least two differentially lighted iris images to generate the boundary delineated image.

10. The iris recognition device of claim 8, wherein the iris recognition module is further configured to:
    perform a ratio comparative analysis between the at least two differentially lighted iris images to generate the boundary delineated image.

11. The iris recognition device of claim 8, wherein the iris recognition module is further configured to:
    perform a difference analysis between the at least two differentially lighted iris images to generate the boundary delineated image.

12. The iris recognition device of claim 8, wherein the iris recognition module is further configured to:
    apply anti-spoofing techniques to at least one of the at least differentially lighted iris images or the boundary delineated image.

13. The iris recognition device of claim 8, wherein a size of the iris recognition device is in an approximate order of 10 cm or less in any dimension from a distance of approximately 1 meter between the iris recognition device and the subject.

14. The iris recognition device of claim 13, wherein the iris recognition device is operable although an angle between a first line from the pupil area to the at least one illuminator and a second line from the pupil area to the at least one image capturing device is less than or equal to approximately 6 degrees.

15. An access control system, comprising:
an access control module;
an iris recognition device in communication with the access control module, the iris recognition device comprising:
   at least one illuminator;
   at least one image capturing device configured to cooperatively work with the at least one illuminator to capture at least two differentially lighted iris images for a subject to be recognized, wherein the at least one illuminator cooperatively works with the at least one image capturing device; and
   an iris recognition module configured to:
      delineate an iris-pupil boundary by comparing a pupil area from one of the at least two differentially lighted iris images with another pupil area from another of the at least two differentially lighted iris images to generate a boundary delineated image;
      segment and encode the boundary delineated image to generate at least one iris template;
      match the at least one iris template against an enrolled iris; and
      generate an access signal for the subject when the at least one iris template matches the enrolled iris; and
the access control module configured to permit access based on the access signal received from the iris recognition module.

16. The access control system of claim 15, wherein the iris recognition module is further configured to:
   apply image comparative analysis to the at least two differentially lighted iris images to generate the boundary delineated image.

17. The access control system of claim 15, wherein the iris recognition module is further configured to:
   perform a ratio comparative analysis between the at least two differentially lighted iris images to generate the boundary delineated image.

18. The access control system of claim 15, wherein the iris recognition module is further configured to:
   perform a difference analysis between the at least two differentially lighted iris images to generate the boundary delineated image.

19. The access control system of claim 15, wherein the iris recognition module is further configured to:
   apply anti-spoofing techniques to at least one of the at least differentially lighted iris images or the boundary delineated image.

20. The access control system of claim 15, wherein the at least one illuminator and the at least one image capturing device are spaced irrespective of redeye effects, wherein a size of the iris recognition device is in an approximate order of 10 cm or less in any dimension from a distance of approximately 1 meter between the iris recognition device and the subject, and wherein the iris recognition device is operable although an angle between a first line from the pupil area to the at least one illuminator and a second line from the pupil area to the at least one image capturing device is less than or equal to approximately 6 degrees.

* * * * *